Jan. 15, 1929.  J. H. LOEB  1,699,366
SIGNAL DEVICE FOR PNEUMATIC TIRES
Filed March 24, 1925   2 Sheets-Sheet 1

WITNESSES

INVENTOR
J. H. Loeb,
BY
ATTORNEYS

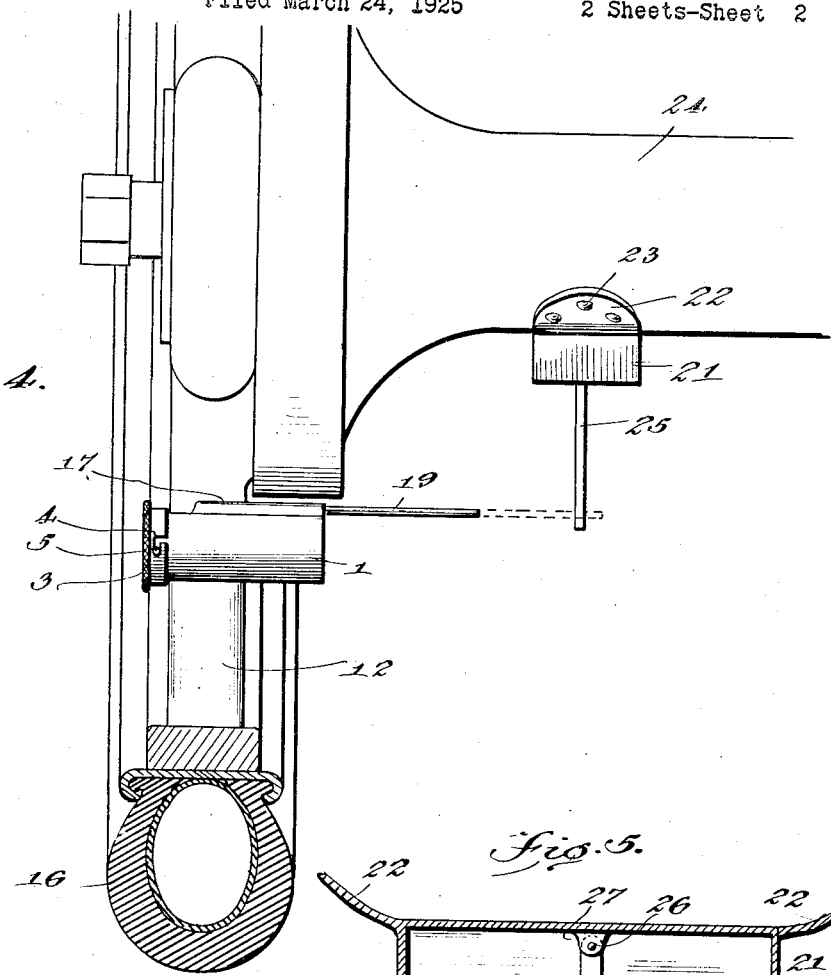
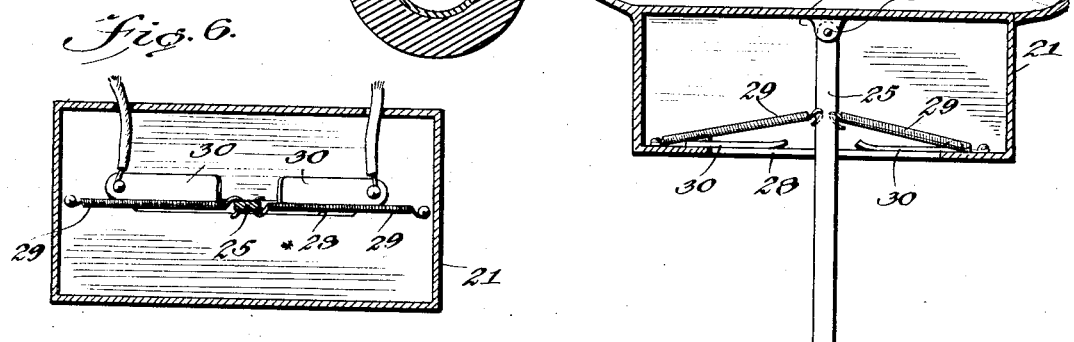
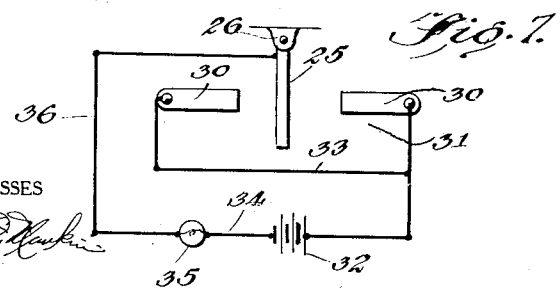

Patented Jan. 15, 1929.

1,699,366

UNITED STATES PATENT OFFICE.

JOSEPH H. LOEB, OF MORGAN CITY, LOUISIANA.

SIGNAL DEVICE FOR PNEUMATIC TIRES.

Application filed March 24, 1925. Serial No. 17,981.

My invention relates to improvements in signal devices for pneumatic tires, and it consists in the combinations, constructions and arrangements herein described and claimed.

An object of the invention is the provision of a simple and reliable device for indicating to the driver of a vehicle that a low pressure exists in a pneumatic tire on a wheel of the vehicle so that the driver of the vehicle will be apprised of the condition of pressure in the tire in time to make any necessary repairs and to inflate the tire sufficiently to prevent such injury to the tire or to the wheel rim as would be likely to result from continued use of the vehicle without increase of pressure in the tire.

A further object of the invention is the provision of a signal device of the character described which will be actuated on rotation of the vehicle wheel with which it is associated when the pressure within the tire on the wheel is low.

Other objects and advantages of the invention will be apparent from the following description, considered in conjunction with the accompanying drawings, in which—

Figure 4 is a transverse vertical section through the rim portion of the wheel shown in Figure 1, showing the hub of the wheel, the axle housing and the signal device in elevation, Figure 5 is a vertical section through a switch which is comprised in the signal device, Figure 6 is a vertical section through the switch, the view being taken at right angles to Figure 5;

Figure 7 is a view showing more or less diagrammatically a typical circuit which may be employed in the use of the signal device.

Figure 1:
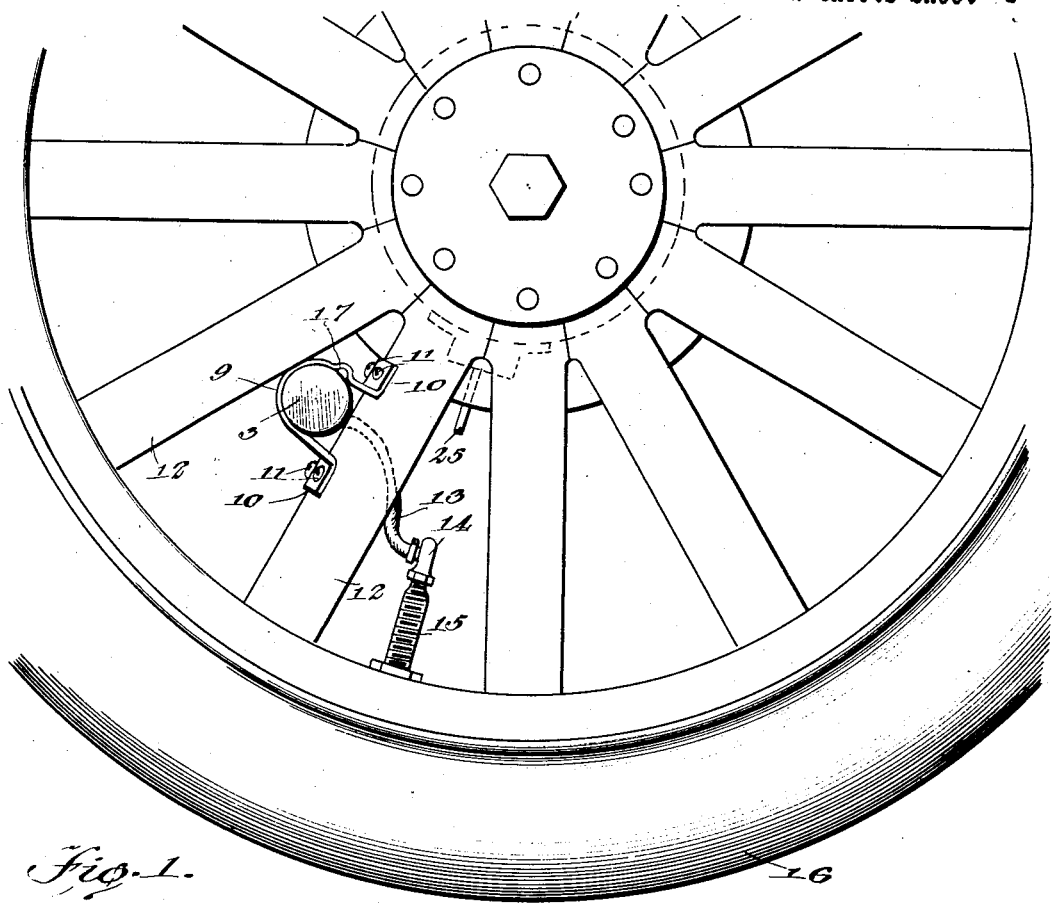
Figure 1 is a fragmentary elevation of a vehicle wheel and its mounting, showing the improved signal device applied.

The actuating mechanism of the signal device comprises a substantially cylindrical casing 1 which is closed at one end by a fixed end 2 and at its other end by a removable cap 3 having a cylindrical portion 3ª fitting slidably on an end portion of the cylinder 1 and being formed with right angular notches 4 in its edge portion with which an outwardly extending stud projection 5 on the cylinder 1 is engaged.

A pneumatic body 6 is disposed in the cylinder 1 between the fixed end 2 and the plunger 7. An expansion spring 8 is disposed in the cylinder 1 between the plunger 7 and the head of the cap 3. The cylinder 1 is secured on a vehicle wheel, as by means of a clip 9 having attaching portions 10 secured by screws 11 to a spoke 12 of the wheel so that the axis of the cylinder 1 is parallel to the axis of rotation of the wheel and the end portion of the cylinder having the spring 8 disposed therein is outermost.

The pneumatic body is shown as being joined to a tube 13 which extends exteriorly of the casing 1 and is connected at its outer end by means of a pipe fitting 14 of any suitable known type of construction to the tubular stem 15 of a pneumatic tire 16 which is mounted on the rim of the wheel. The arrangement is such that air will pass through the stem 15, the fitting 14 and the tube 13 from the tire 16 to the space within the pneumatic body 6 so that the pressure within the pneumatic body 6 will vary directly with the pressure within the tire 16. This result can be accomplished in any suitable known manner, as by means of a projection, not shown, on the fitting 14 for holding the usual valve, also not shown, in the tire valve stem open when the fitting 14 is in place on the tire valve stem or by removing the usual valve from the tire valve stem when the fitting 14 is applied to the tire valve stem.

A tubular guide 17 is joined integrally or otherwise with the casing 1 and extends in parallel relation to the axis of the casing 1. The tubular guide 17 is open at the end thereof that is innermost when the casing 1 is secured to the wheel in the manner hereinbefore described. A longitudinal slot 18 is formed through the walls which are located between the tubular guide 17 and the interior of the casing 1. An actuating arm 19 of greater length than the tubular guide is bent at one end, as at 20, to extend through the slot 18 and is joined integrally or otherwise to the plunger 7.

A switch comprises a box-like case 21 having attaching portions 22 secured by screws 23 or like fastening devices to a fixed part of the vehicle, as for example to the housing 24 of the axle on which the wheel is mounted. A switch arm 25 is pivotally attached at one end, as at 26, to a lug 27 on the inner face of the wall of the casing 21 that is next to the axle housing 24. The switch arm 25 extends through a slot 28 in the outer wall of the case 21 and is swingable about the axis of the pivot element 26 between the ends of the slot 28. However, the switch arm 25 is yieldingly held against swinging from a position in which it extends through the slot 28 midway of the length of the latter by a pair of retractile springs 29 which extend oppositely from the switch arm 25 within the casing 21 and are attached at their adjacent ends to the switch arm and at their remote ends to opposite end portions of the casing 21. A pair of stationary contacts 30 are secured to the casing 21 within the latter and adjacent to opposite ends of the slot 28 so that one of the contacts 30 will be engaged by the arm 25 when the latter has been swung in the slot 30 adjacent to one end of the latter and the other contact 30 will be engaged by the contact 25 when the latter has been swung in the slot 28 to a position adjacent to the other end of the slot. The springs 29 function to hold the arm 25 out of contact with both the contacts 30 and midway between the adjacent ends of the latter when the arm 25 is not actuated by a force external to the casing 21. The arm 25 may be made of electrical conducting material and may be termed a swingable contact. One of the contacts 30 may be connected by an electrical conductor 31 to one side of a battery 32 or other source of electric current supply and the other contact 30 will be connected by an electrical conductor 33 with the conductor 31. The second side of the battery 32 may be connected electrically by a conductor 34 with one side of an electrically operated signal 35 which preferably is an electric lamp located on the dash board of the vehicle to which the device is applied. The other side of the signal 35 is connected by a conductor 36 with the swinging contact or switch arm 25. It of course will be understood that the stationary contacts 30 and the swinging contacts 25 may be insulated from the casing 21 in any suitable known manner, no means therefor being shown. It also will be understood that the circuit for operating the signal 35 will be closed when the contact 25 is in contact with either of the stationary contacts 30.

Figure 2:
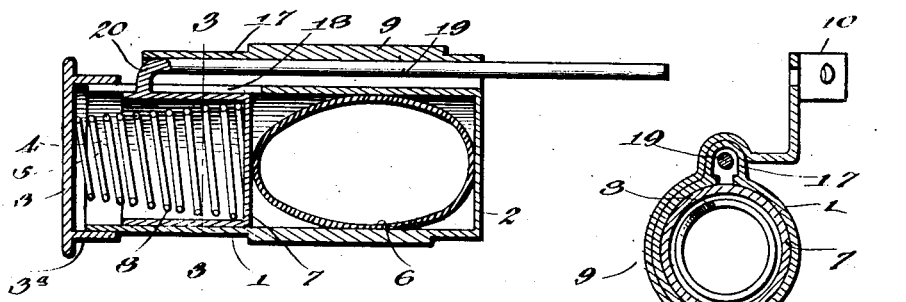
Figure 2 is a longitudinal vertical section through the actuating mechanism of the signal device.
Figure 3:
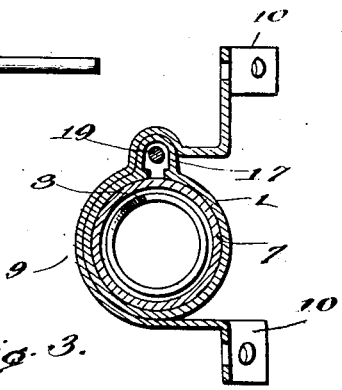
Figure 3 is a section along the line 3—3 of Figure 2.

With the arrangement of switch case 21 on the axle housing 24 and cylinder 1 secured to the wheel as described in the foregoing, the axial line of the actuating member 19 will intersect the switch arm 25 adjacent to the outer end of the latter. When the pressure in the tire is relatively high, the pneumatic body 6 will be inflated and expanded to an extent sufficient to hold the plunger 7 against movement in the cylinder 1 from the position shown in Figure 2 and the actuating arm 19 will be prevented from extending from the tubular guide 17 to an extent sufficient to cause contact of the actuating member 19 with the outer end portion of the switch arm 25 when the wheel is rotated. However, when the pressure within the tire and within the pneumatic body 6 falls to a definite low level, the spring 8 will be effective to move the plunger 7 longitudinally of the casing 1 toward the inner end of the latter against the pressure of fluid within the pneumatic body 6 and the actuating arm 19 will be extended from the tubular guide 17 sufficiently to contact adjacent to its outer end with the outer end portion of the switch arm 25 when the wheel is rotated and to cause the arm 25 to swing in the slot 28 to position to contact with one or the other of the stationary contacts 30, depending on the direction of rotation of the wheel about its axis of rotation. The actuating arm 19 then slides off the outer end of the switch arm 25 since the axes of the actuating arm 19 and the switch arm 25 extend substantially at right angles to each other and the springs 29 will function to return the switch arm 25 to neutral position as soon as such switch arm has been disengaged by the actuating arm. However, the circuit for operating the signal 35 will be closed while the switch arm 25 is in contact with one of the stationary contacts 30 and the driver of the vehicle will be apprised of the condition of pressure within the tire. The signal 35 will be operated during each complete rotation of the wheel and when the signal 35 is an electric lamp, the repeated closing and opening of the circuit will cause the lamp to flash on and off during the rotation of the wheel so that the attention of the driver of the vehicle is likely to be attracted thereto.

I claim:—

In a vehicle having an indicator and a switch arm carried on the axle of the vehicle, a pressure-switch actuating device comprising a casing having a longitudinal slot extending the length of the casing, an expansible pressure member in an end portion thereof, and a spring pressed plunger slidably mounted in the other end of the said casing and having a switch actuating rod integrally formed on said plunger and adapted to slide longitudinally in said slot for actuating said switch arm.

JOS. H. LOEB.